March 14, 1967 R. WARSAGER 3,309,256
APPARATUS FOR SURFACE DECORATING OF ARTICLES
Filed May 7, 1965 2 Sheets-Sheet 1
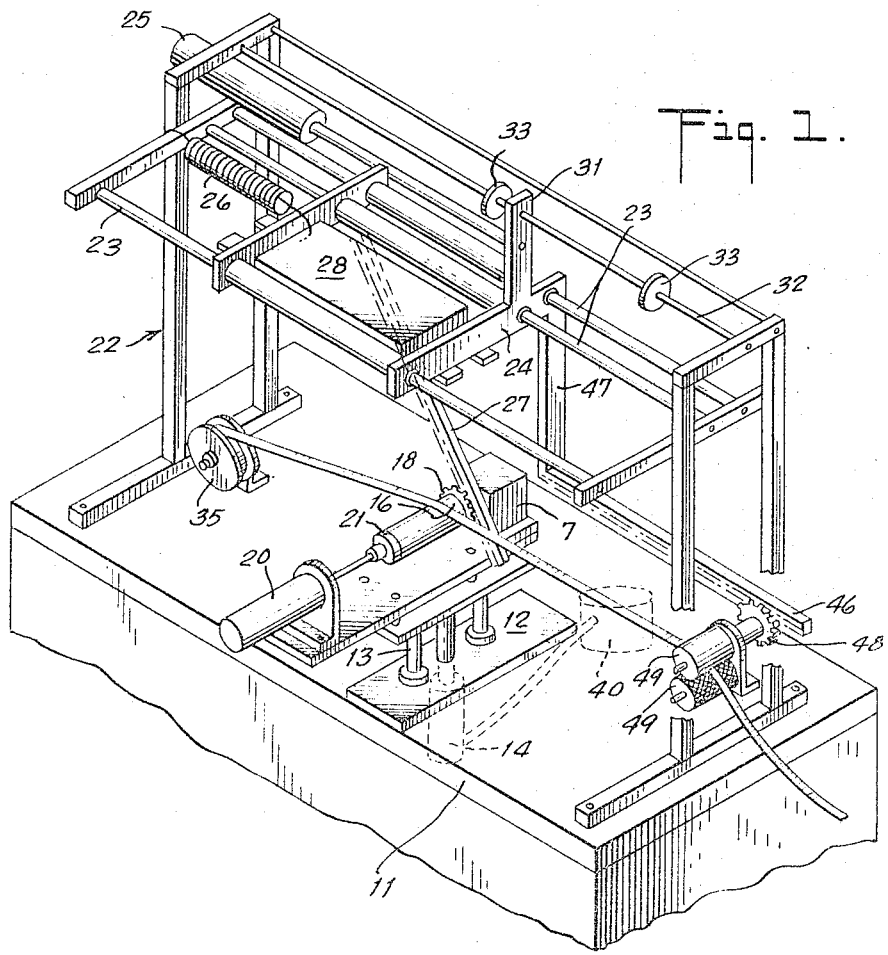
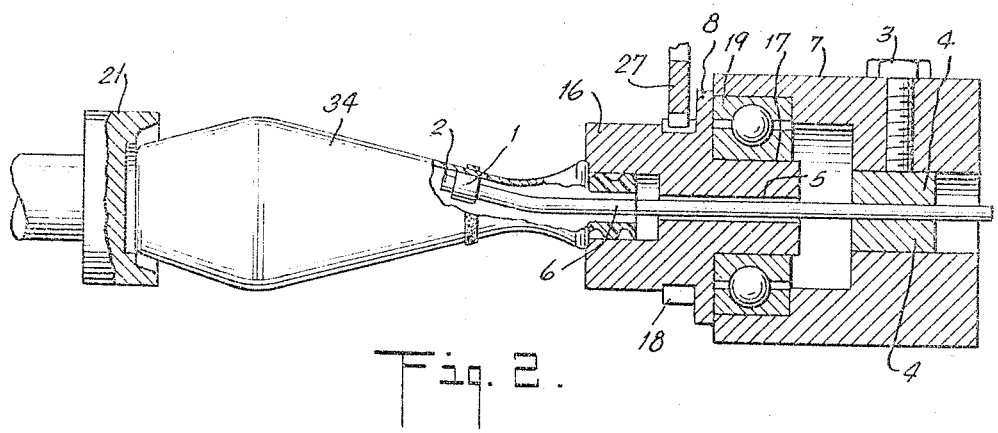
INVENTOR.
RUBIN WARSAGER
BY Ward, Haselton, McElhannon,
Orme, Brooks + Fitzpatrick
ATTORNEYS

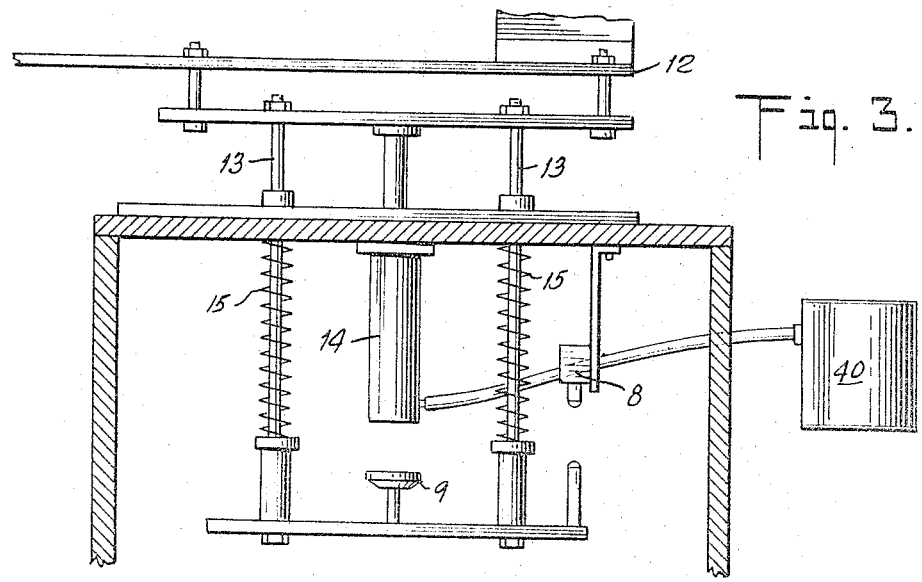
Fig. 3.
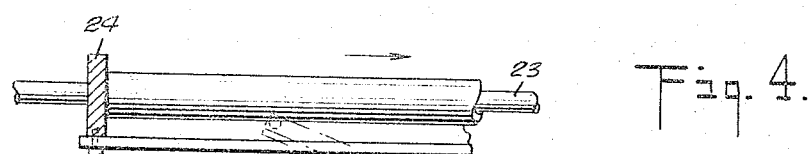
Fig. 4.
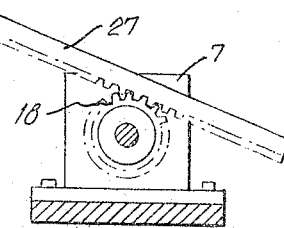
Fig. 5.
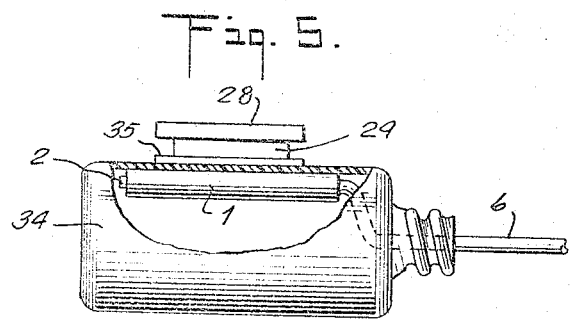

United States Patent Office 3,309,256
Patented Mar. 14, 1967

3,309,256
APPARATUS FOR SURFACE DECORATING OF ARTICLES
Rubin Warsager, 502 Summer Ave., Newark, N.J. 07104
Filed May 7, 1965, Ser. No. 453,943
14 Claims. (Cl. 156—542)

This patent application is a continuation-in-part of application Ser. No. 367,454 filed on May 14, 1964 now abandoned.

This invention relates generally to a method and apparatus for surface decorating of articles, and more particularly to a method and apparatus for decorating hollow articles, such as plastic bottles in which the decoration is uniformly applied to the surface of the article to be decorated regardless of minute variations in the surface being decorated.

The ornamentation of hollow items, such as blow molded plastic articles, is known to the industry. Hot stamping, printing, or decorating is accomplished by pressing a die, or other transfer device to the hollow item. To avoid deformation of the article (or other object) at the point where the decoration is applied, the items have been pressurized to give them resistance to deformation. The decorations have not been distinct, clear and sharply defined, and it has been impossible to decorate bottles beyond certain very restricted areas.

Another disadvantage with prior art methods and apparatus for the surface decorating of articles is that where there are variations in the surface being decorated the decoration is unevenly applied. This results in decorations that vary in intensity, i.e. in tone and shading, and results in decorations that are not distinct and sharply defined. This is particularly true when ornamenting by means of hot stamping and for this reason the prior art has generally not utilized hot stamping in ornamenting hollow articles. One of the reasons for this is that prior art methods and apparatus which have attempted to decorate hollow articles have done so by pressing a die or other transfer device to the surface of the hollow item to be decorated with uniform force or pressure. These dies were shaped to conform to the theoretical configuration of the article to be decorated. This limited the area that could be decorated to approximately twenty-seven (27) percent of the surface area. Due to this application of uniform force or pressure if any irregularities occurred in the area being decorated the result was an imperfect decoration. Since uniform pressure or force was being used, any ridges on the surface being decorated resulted in a greater application of decoration, while those portions of the surface which have valleys or concavities had little or no decoration applied.

In view of the foregoing it is the primary object of the present invention to provide a method and apparatus for surface decorating articles in which the decoration is uniformly and symmetrically applied to the surface being decorated regardless of minute irregularities in the surface.

Another object of the present invention is to provide a method and apparatus for surface decorating articles which are not longitudinally symmertical.

A further object of the present invention is to provide a method and apparatus for decorating bottles about the entire circumference, i.e. 360 degrees in one continuous operation.

It is a further object of this invention to provide a method and apparatus for applying decoration to shaped hollow articles having a horizontal cross sectional area which varies from top to bottom.

It is yet a further object of this invention to provide a method and apparatus for applying a clear, clean, sharply defined decoration to a hollow article.

Still another object of this invention is to provide a method and apparatus for rapidly interchanging mandrel assemblies to enable decoration of different portions of a hollow container.

Still a further object of this invention is to provide a method and apparatus which is fast, easy to operate, and economical in accomplishing its purposes.

These and further objects and features of the invention will appear from a reading of the following detailed description of preferred embodiments of the invention to be read in conjunction with the accompanying drawings wherein like components in the several views are identified by the same reference numeral.

In the drawings:

FIGURE 1 is a perspective view of the apparatus;

FIGURE 2 is a side elevational view of the portion of the apparatus in which an item is seized for rotation;

FIGURE 3 is an end elevational view of a portion of the apparatus showing the platform elevation means;

FIGURE 4 is a partial side elevational view showing the rack and pinion means for synchronously contacting a die with a rotating object to be decorated; and FIGURE 5 is a side elevational view of a portion of the apparatus in which a different shaped offset support (alternative to the one shown in FIG. 2) is shown.

The apparatus for printing containers comprises a table 11 having mounted thereon a vertically adjustable platform 12. The platform 12 is mounted on a pair of shafts 13, 13. An air cylinder 14 raises the platform 12 and maintains a uniform pressure on the platform 12 in a manner to be described. Springs 15, 15 are carried by the shafts 13, 13 and serve to restore the shafts 13, 13 to normal position when the air pressure in the cylinder 14 is relieved. An adjustable stop 9 is provided to limit the elevation of the table 12 in the event of failure in the system.

Mounted up on the platform 12 is a driven rotatable support 16 for one end of the plastic bottle or similar container. The support 16 has a bearing surface 17, and a pinion 18, with a flange 8 to limit insertion into the housing 7. The bearing surface 17 is rotatable on a bearing 19 in a housing 7. A mandrel 6 passes through a bore 5 in the rotatable support and is rigidly held against rotation by the clamping block 4, locked in place by the bolt 3, so that the mandrel 6 remains stationary as the surrounding support 16 turns. The outer-end of the mandrel 6 is offset (see FIG. 2), so that a rotatable end 2, covered by a compressible cover 1, defining a support, will engage the inside surface of the item 34 opposite to the point of engagement of the hot die during stamping.

The platform 12 also supports an air-cylinder 20 which carries a freely rotatable second support 21. When the air-cylinder 20 is actuated, the second support 21 is moved in the direction of the first rotatable support 16 so that they seize a hollow plastic item 34 between them.

Above the table 11, a frame 22 is provided with generally horizontal rods 23. A carrier 24 for an embossing or hot stamping die is provided. The carrier 24 is slidable on the rods 23. An air-cylinder 25 is mounted on the frame 22 and connected to the carrier 24, to move and transport the carrier and a die attached to the carrier 24. When the pressure on the air-cylinder 25 is relieved, a spring 26 returns the carrier to normal position. A rack 27 is pivotally attached to the carrier 24. The rack 27 engages the pinion 18 on the support 16, so that the movement of the carrier will produce a corresponding rotation of the rotatable support 16. The carrier 24 supports an electric heater 28 and a hot stamping die or other decorating means. Appropriate electrical connections for the heater 28 are provided. The carrier 24 is provided with an upright 31 which embraces a rod 32. The rod 32 is threaded and has a pair of stops or limiters 33 mounted thereon; they limit the motion of the carrier and are adjustable.

The operation of the apparatus is as follows: A thin walled, blown plastic bottle or similar item 34 is positioned on the stationary mandrel 6 in engagement with the driven rotatable support 16; the air cylinder 20 is actuated to engage the second freely rotatable support 21 with the opposite end of the item 34. The air cylinder 14 is then actuated, and raises the platform 12 to a position at which the item 34 is positioned for peripheral engagement with the hot stamping die. The electro-switch 8 is operated when the platform 12 rises, to actuate the apparatus (not shown) supplying air to the cylinder 25. The circuit to the heater 28 has been closed so that the die is maintained in heated condition. A roll of tape 35 is led over the item 34. The die 29 moves in engagement with the transfer tape 35 over the item 34 by means of the air cylinder 25 moving the carrier 24, and the rack 27 rotates the item 34 in synchronization with the movement of the die 29. The tape 35 is fed between the heated die 29 and the item 34, thereby applying the transfer material or roll leaf from the tape 35 to the surface of the item 34. A tape puller 36 moves the tape along, as the die and the item 34 move in synchronization with each other and with the tape 35 intruded between them. A rack 46, attached to an arm 47 on the carrier 24, engages a pinion 48, which drives the pull rollers 49, 49. The roll leaf is transferred from the tape 35 to the item 34 as the tape puller 36 moves the tape in synchronization.

The pinion 18 is dimensioned particularly to produce rotation of the item 34 at the exact rate required to synchronize its surface contact with the movement of the hot stamping die 29. It is apparent that innumerable supports 16 and mandrels 6 may be provided, having a different pinion 18 diameter, and different shaped mandrels 6, so as to produce exact synchronized movement and support of the item 34 in correspondence with the movement of the die 29. The end of the support 16 is undercut (see FIG. 2) to engage the end of the item 34 in exact conformity, and tight engagement. As the die engages the item 34 at its external surface, the mandrel 6 is dimensioned so as to provide a rotatable tip 2, at the precise point of engagement of the die so that a rigid interior support for the item 34 is provided. Embossing on various parts of irregular shaped items 34 is easily accomplished by the rapid interchangeability of the mandrels. Mandrels 6, of varying sizes, shapes, and dimensions can be inserted, so that decorating of the item 34 may even be accomplished at a narrow neck, as shown in FIGURE 2. This previously could not be accomplished. In fact, ornamentation may be applied to innumerable irregular shaped items, if offset mandrels are provided to support the item precisely at the point where the ornamentation is to be applied.

With a relatively thin rigid mandrel 6 it is possible for the first time to enter a small mouth item 34, as shown in FIGURES 2 and 5, such item being longitudinally asymmetrical, and to apply decoration around the item 34 for a full 360°, without impairing the clarity and distinctness of the decoration.

The rotatable support 1 on a strong, rigid mandrel 6 enables this to be done. The item 34 rotates in synchronism with the movement of the die 29, being held between the holders 16, 21. The item 34 is actually rotated by the holder 16 which is driven, and the item 34 does not depend upon the tangential contact of the die 29 to make it rotate.

As can be seen from the foregoing, the surfaces of the article 34 is decorated by feeding the tape 35 between the heated die 29 and the item 34, thereby applying the transfer material or roll leaf from the tape 35 to the surface of the article 34. This transfer of the material from the tape 35 to the surface of the article 34 is accomplished by maintaining pressure contact between the die 29 and the surface of the article 34 with the tape 35 being compressed therebetween. If the die 29 presses the tape 35 against the surface of the article 34 with insufficient pressure then very little or none of the transfer material or roll leaf will be transferred from the tape 35 to the surface of the article 34. On the other hand, if the die 29 forces the tape 35 against the surface of the article 34 with excessive pressure, then the decoration will be blurred, smudged and distorted and, in addition, an excessive amount of transfer material or roll leaf will be transferred from the tape 35 to the surface of the article 34.

It can be seen from the foregoing that if the die 29 and article 34 are held in engagement by a constant pressure, then the force or pressure existing existing between the surface of the article 34 and the die 29 will vary depending upon irregularities in the surface of the article 34. Thus, on those portions of the surface of the article 34 which have ridges or raised portions, the pressure between the die 29 and surface of the article 34 will be increased, while on those portions where the surface of the article 34 is indented or concave the pressure between the die 29 and the surface of the article 34 will be decreased. This factor results in decorations which are not distinct, clear and sharply defined and which vary in coloring and intensity. For this reason it has heretofore been considered virtually impossible to decorate the surfaces of plastic hollow articles, and to obtain decorations which are distinct, clear, sharply defined and of uniform intensity.

This is overcome by the method and apparatus of the present invention by maintaining the surface of the article 34 against the die 29 in floating or cushioning engagement, i.e. by maintaining the force or pressure between the die 29 and the surface of the article 34 uniform regardless of irregularities in the surface of the article 34. This is accomplished by providing the cylinder 14 with air pressure from a source of variable pressure such as the tank 40. The source of variable pressure 40 therefore acts as a cushion, the pressure varying in accordance with irregularities in the surface of the article 34 to maintain the pressure between the surface of the article 34 and the die 29 uniform. In this manner the vertical position of the cylinder 14 is continually varying depending upon iregularities in the surface of the article 34. The manner of accomplishing the foregoing is to determine the correct pressure that should exist between the surface of the article 34 and the die 29. Once this pressure is determined, the pressure source 40 is adjusted to always maintain this pressure between the two surfaces regardless of variations or irregularities in the surface of the article 34. It has been found that by providing this uniform pressure or cushioning effect that decorations can be obtained which are uniformly distinct, clear and sharply defined regardless of irregularities in the surface being decorated.

What has been described is a method and apparatus for decorating the surface of hollow and other articles, the decoration being uniformly applied to the surface regardless of any iregularities in the surface of the article being decorated. It is to be understood that although several embodiments of the invention have been described and illustrated, that substitutions may be made therein without departing from the spirit of the invention as defined in the appended claims.

I claim:

1. Apparatus for decorating the circumferential surface of a cylindrical object in which such surface has irregularities therein, said apparatus comprising a die, pneumatic means for maintaining said surface in contact with said die, a holder mounting a transfer tape to be interposed between said surface and said die whereby as said die is pressed against said surface material is transferred from said transfer tape to said surface, and regulating means for maintaining the contact pressure between said surface and said die uniform regardless of irregularities in said surface whereby said surface is uniformly decorated.

2. Apparatus for uniformly decorating the circumferential surface of a cylindrical hollow object the surface of which has irregularities, said apparatus comprising a heated die, pneumatic means for maintaining said surface in contact with said die, a holder for mounting a transfer tape to be interposed between said surface and said die whereby as said die is pressed against said surface material is transferred from said transfer tape to said surface, and regulating means for maintaining the contact pressure between said surface and said die uniform regardless of irregularities in said surface whereby said surface is uniformly decorated.

3. Apparatus for uniformly decorating the circumferential of a cylindrical hollow object the surface of which has irregularities, said apparatus comprising means to rotate said hollow object, a heated die, pneumatic means for selectively maintaining said surface in contact with said die, a holder for mounting a transfer tape to be interposed between said surface and said die whereby as said die is pressed against said surface material is transferred from said transfer tape to said surface, means for feeding said transfer tape between said surface and said die, and regulating means for maintaining the contact pressure between said surface and said die uniform regardless of irregularities in said surface whereby said surface is uniformly decorated.

4. Apparatus in accordance with claim 3 further including means for synchronizing the rotation of said hollow object and the feeding of said transfer tape between said surface and said die.

5. Apparatus in accordance with claim 4 further including means for supporting the interior of said hollow object opposite the portion thereof in contact with said die.

6. An apparatus for decorating a hollow item comprising a first rotatable holder for a hollow item, a rigidly mounted mandrel extending into the hollow item on the first rotatable holder, an offset portion on the mandrel in the hollow item, a rotatable support on the offset portion of the mandrel, engaged with the internal surface of the hollow item opposite to the point on the external surface of the hollow item to which decoration is to be applied, a carrier mounted for linear movement, means mounted on the carrier to apply decoration to the hollow item, means to move the carrier, means to bring the hollow item on the rotatable holder into tangential engagement with the means to apply decoration during linear movement of the carrier, means to rotate the first rotatable holder and the hollow item in synchronism with the movement of the means to apply decoration, means to feed a transfer tape between the hollow item and the means to apply decoration at their point of tangential engagement, whereby transfer material on the tape is applied to the hollow item.

7. An apparatus according to claim 6 in which the rotatable support is, at least in part, slightly compressible in response to pressure applied externally to the hollow item by the means to apply decoration.

8. An apparatus according to claim 6 further including a second rotatable holder in opposition with the first holder to cooperatively seize the hollow item, means to alternately move the holders to seize and release the item between them.

9. An apparatus according to claim 6, in which the means to roatate the first rotatable holder in connected to the carrier.

10. An apparatus according to claim 9, in which the means to rotate the first rotatable holder is a pinion attached to the first rotatable holder and a rack attached to the carrier and operably engaged with the pinion.

11. An apparatus according to claim 9, in which the means to apply decoration to the item is a hot die and the means to feed a transfer tape is a holder for mounting said transfer tape, a tape puller, a roll of transfer tape mounted on the holder led between the decorating means and the external wall of the item to be decorated and into the tape puller, means to opearte the tape puller to move the tape in synchronism with movement of the means for applying decoration and with the synchronous movement of the external wall of the item at their point of tangential engagement.

12. An apparatus according to claim 6, in which the mandrel is coaxial with the hollow item.

13. An apparatus according to claim 6, in which the rotatable support on the offset portion of the mandrel is coaxial with the mandrel.

14. An apparatus according to claim 6, in which the mandrel has a rotatable support on the offset portion having an axis diverging from the axis of the mandrel.

References Cited by the Examiner
UNITED STATES PATENTS

| | | | |
|---|---|---|---|
| 2,784,133 | 3/1957 | Grupe | 156—542 |
| 3,058,514 | 10/1962 | Flood | 156—542 |
| 3,139,368 | 6/1964 | Flood | 156—475 |
| 3,208,897 | 9/1965 | Flood | 156—475 |

EARL M. BERGERT, *Primary Examiner.*

M. L. KATZ, *Assistant Examiner.*